Sept. 15, 1959  W. A. MIELKE ET AL  2,904,005
ANTI-KICK ATTACHMENT FOR DAIRY STANCHIONS
Filed June 10, 1957  2 Sheets-Sheet 1

INVENTOR.
William A. Mielke
Leonard R. Amend

Sept. 15, 1959 W. A. MIELKE ET AL 2,904,005
ANTI-KICK ATTACHMENT FOR DAIRY STANCHIONS
Filed June 10, 1957 2 Sheets-Sheet 2

INVENTOR.
William A. Mielke
Leonard R. Amend
BY

United States Patent Office 2,904,005
Patented Sept. 15, 1959

2,904,005

ANTI-KICK ATTACHMENT FOR DAIRY STANCHIONS

William A. Mielke and Leonard R. Amend, Brighton, Colo.

Application June 10, 1957, Serial No. 664,603

3 Claims. (Cl. 119—96)

This invention relates to stanchions for holding a dairy cow therein, while she is being milked, of the type used in modern so-called milking parlor dairy barns, and particularly to a novel anti-kick attachment to be secured to such a stanchion, and adapted, in use, to prevent the cow from kicking while being milked, or while medicating the cow's udder.

Our invention has for its object the provision of a trapeze-like bar attachment, pivotally mounted to the center one of the three side bars horizontally and normally placed to comprise the right side of the stanchion, at a position adjacent the cow's right rear leg, when she is in place in the stanchion, and adapted to be swung toward and held removably and rigidly against her said leg, after forcing said leg inwardly of her body from its normal stance, during milking, thereby binding her rear body portion between the left rear stanchion framework and that trapeze bar, and with the trapeze bar positioned to press her said right leg at a point just above her adjacent udder, to prevent her from kicking during the milking process, as it is well known that a cow cannot kick if she cannot spread her rear legs, as when she kicks with a leg she must make an outward arc with that leg, as well as a forward and rear movement thereof, and when she cannot spread her rear legs apart she is, in effect, off-balance and therefore cannot kick.

More particularly, it is an object of our invention to provide a rigid anti-kick bar, pivotally hung from a horizontal bar of the stanchion, about mid-way of the height of the cow's right rear leg, by a pair of rigid pivot arms, with each arm having a rockable loose pivot connection with the horizontal stanchion bar to which pivotally hung and also its connection with the anti-kick bar being a loose connection, and with separate latch means for each arm and adapted for rigidly and removably holding its arm in any one of a plurality of positions on its pivot, inwardly of the stanchion, from the vertical, independently of such arc position of the other of said pivot arms, thus adapting the anti-kick bar for use against the right rear leg of different size and shape cows, as may be within the stanchion, during the milking process.

Another object of our invention is the provision of a novel single latch release lever means for releasing the separate latch means for each pivot arm of our novel trapeze anti-kick bar attachment.

Other and further objects will be apparent to those skilled in the art from the following detailed description and drawings, in which.

Throughout the drawings like characters of reference have been used to represent like parts.

Figure 1:
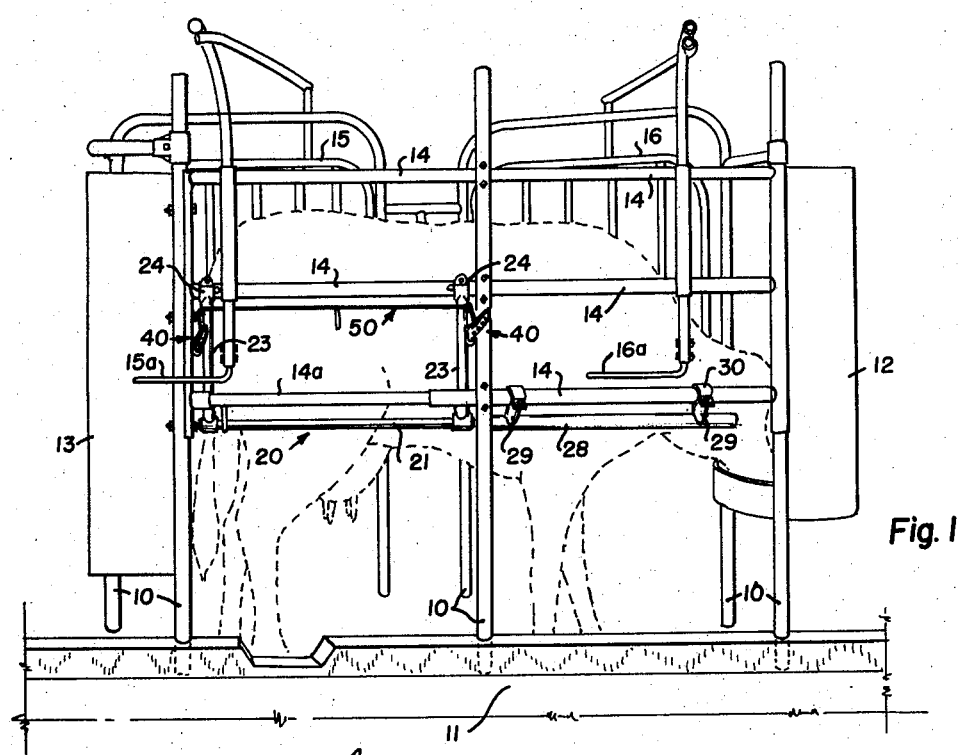
Figure 1 is an elevational view of a modern milking parlor milking stanchion, having our attachment secured thereto and before operational use thereof.

In the modern type of milking stanchions, in use today in so-called milking parlors, the stanchion comprises upright posts 10, held in the concrete floor elevated stanchion platform 11, which platform is raised above the adjacent alley floor of the dairy barn where the operator walks. The stanchion substantially forms a cage, with a feed trough at the front 12, a rear board 13, across the pair of rear posts 10, horizontal bars 14, rigidly secured between the posts 10 on the right or near side, as illustrated, in conventional manner, and a frame-work including a pair of entrance and exit gates 15 and 16 respectively, completing the enclosure at the far side, as illustrated in Figure 1. Cross bars 17, at the front and back of the stanchion, at the top of front and rear pairs of posts 10, connect each side of the stanchion, for reinforcement purposes in conventional manner. The gates 15 and 16 are each hinged to the upright posts 10, on the left side of the stanchion, in conventional manner, and operable by mechanism, indicated as 15a and 16a, respectively, to be open, closed and held closed, in conventional manner, forming no part of our invention. To give access to the right side of the cow in the stanchion, see Figure 1, the lower one of the three horizontal bars 14 is formed for the rear portion 14a thereof to be slidably telescoped into the front portion thereof, in conventional manner as illustrated, to permit easier access to the cow's udder when she is in the stall, or stanchion.

Now to explain our novel invention, as applied to that type stanchion. We provide a novel trapeze bar, indicated generally as 20, comprising a rigid bar 21 slidably held in a pair of sockets 22, with each socket rigidly secured in conventional manner to the end of a rigid bent arm 23, as illustrated. The internal diameter of each socket 22 is larger than the outside diameter of the bar 21, for reason to be explained. Arms 23 are of identical length. The other or upper end of each arm 23 is suitably pivotally hung onto the center one of the horizontal stanchion bars 14, adjacent the rear of the stanchion, as illustrated, by a strap-clamp 24. Each strap-clamp 24 is rigidly bolted by its clamp portion to its end of its arm 23, by suitable means, as illustrated, so as to carry its arm thereby in pivotal suspension from and on the overhanging bar 14, to which the strap portion of the member 24 is secured. The strap portion, of each member 24, is strapped around that bar 14 loosely thereover, for reason to be explained, in conventional manner, thereby completing the trapeze structure 20, as being pivotally hung from that bar 14.

Figure 5:
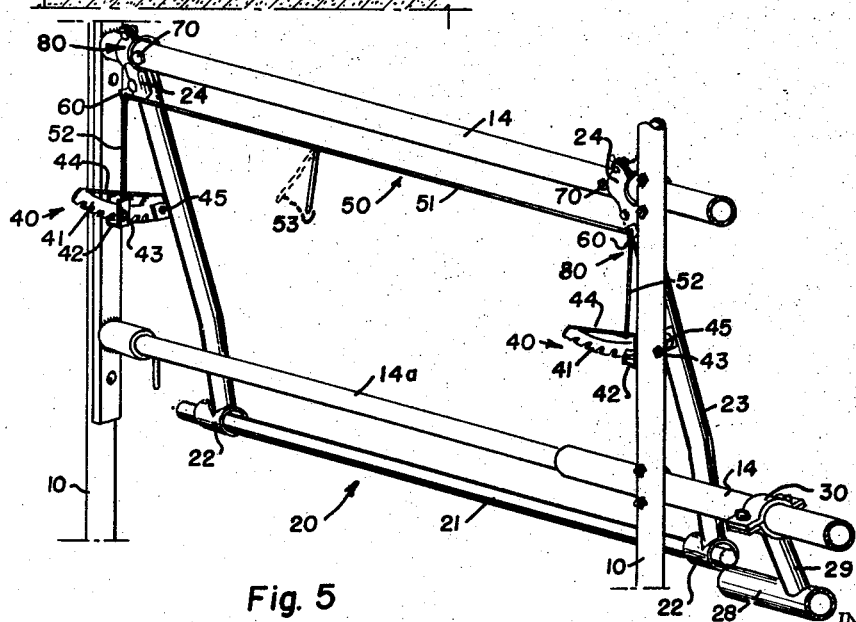
Figure 5 is an enlarged perspective view of our anti-kick attachment in one inoperative position.

We provide a companion hollow stub pipe member 28, of inside larger diameter than the outside diameter of bar 21, suitably secured to the under side of lower bar forward portion 14, as illustrated, in alignment to receive the bar 21 slidably endwise thereinto, to the right as illustrated in Figures 1 and 5, should it be desired to remove the bar 21 from its sockets 22 for any reason, and so as to have the bar 21 ready for re-insertion into the arm-sockets 22 at a later time, as will be explained further. It will be understood that socket pipe 28 is hung horizontally below lower bar 14, and slightly to the right of perpendicular, as illustrated in Figure 5, so as to permit the bar 21 to be able to slide into member 28 and alongside of adjacent stanchion post 10 when unit 20 is not in use and is in alignment with 28. Member 28 is rigidly secured to bar 14, as illustrated by stub portions 29 welded thereto, which, in turn, have suitable straps 30 tightly clamped onto the bar 14.

Figure 4:
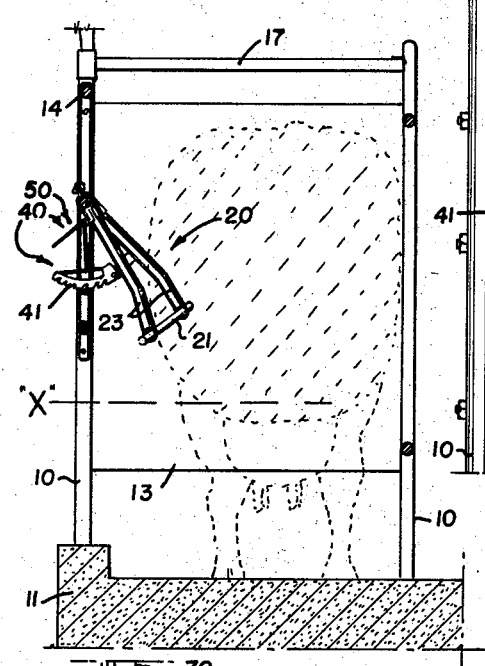
Figure 4 is a vertical cross-sectional view taken on the line 4—4 of Figure 2 and looking toward the rear of the stanchion, with our attachment in operative use position.
Figures 6, 7:
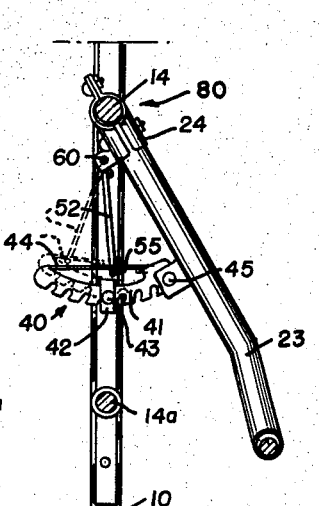
Figure 6 is a partial enlarged view of one pivot arm end of our novel trapeze anti-kick bar attachment.
Figure 7 is a partial cross-sectional view taken on the line 7—7 of Figure 6, looking in the direction of the arrows.

We provide a latch holding means, for holding the trapeze bar 20, in any pivotal adjustment of the bar 21, by its arms 23 inwardly of the stanchion, to the adjacent upright posts 10 of the stanchion, comprising a crescent-shaped latch member, indicated generally as 40, carried by each arm 23. Each latch means comprises a crescent member 41, having its lower edge notched, and with an end thereof pivotally loosely secured, by any suitable means as 45, to a projection, provided for the purpose on its adjacent arm 23, as illustrated in Figures 5 and 7. Notches of each latch 41 are of equal size and number, as are the shape and size of the latches 41. We provide a U-shaped strap and bolt latch-dog member 42, with the space between the arms of each strap 42 being wider than the thickness of a latch member 41, so as to permit movement of a latch 41 between those arms, and mount 42 to the upright post 10 adjacent 40 and vertically even with the pivot 45 of the latch, with the arms of each U-shaped member placed upright, by a suitable bolt 43 extending through both arms of the U-shaped member 42 and the post 10, securing the U-shaped member 42 rigidly in position, as illustrated. Each latch member 40 has such a U-shaped strap or guide member 42, so secured to its adjacent post 10. It will be seen that each latch bar 41, being freely pivoted at its pivot 45, to its arm 23, will rest of its own weight on the bolt 43 of its U-shaped strap 42, as illustrated. The notches, on the under side of each latch bar 41, slant slightly to the left or forwardly of the latch, as illustrated, to assist in holding engagement of the latch when one of those notches falls over its bolt 43, the size of each notch being sufficient to permit the weight of the bar 41 to cause the bar 41 to swing on its loose pivot 43 sufficiently to engage any one of those notches onto and partially around that bolt, with thus the bar 41, in such an engagement of a notch and bolt, being held by the bolt against the notch, from horizontal movement to the left as illustrated, and in turn that latch bar holds the arm 23, to which it is attached, from swinging down, as a pendulum, from its pivot point 80, for reasons to be further explained. As will be further explained, and as illustrated in Figures 1 and 4, our anti-kick trapeze bar 20 is pivotally swung manually by the operator by its arms 23 until bar 21 presses against the cow's right rear leg, when latch bars 41 will fall, of their inherent weight, on latch pivots 43, with a notch of each bar engaging its bolt 43 within U-shaped member 42, and thus the bar 21 will be rigidly held against the cow's leg by the latch bars 41 in latch engagement with their respective bolts 43, until such time as those latch bars are disengaged from their respective bolts 43. To release the anti-kick bar 21, and permit it to swing down or toward the right side of the stanchion, being the near side as viewed in Figure 1, the latch bars 41 have to be raised, on their respective pivots 45, so as to disengage the notch of each, engaging its respective bolt 43. To assist in accomplishing the latter, in one operation, we provide a latch releasing means, indicated generally as 50. Latch releasing means 50 comprises a unitary rigid U-shaped yoke bar, referring to Figure 5, having a horizontally positioned portion 51, lower extending arms 52, a handle 53 extending from about the center of portion 51, and inwardly extending hooks 55 from the bottom of arms 52 in opposing relationship to each other, with the arms and hooks arranged to have hooks 55 placed just under lifting rods 44 of the latch bars 41, when 50 is constructed in size and dimensions and mounted as illustrated, and as further illustrated in Figure 7. It is to be noted that we make 50 of a bar with sufficient strength so that it will not bend in use, and that we pivotally mount it to and it is carried by the trapeze bar unit 20, by so mounting it in bearing tabs 60, provided for the purpose, on the strap-clamp members 24. Tabs 60, one to each strap-clamp 24, are welded to those clamps, and each comprises a projection suitably secured, as by welding, to a member 24, being threaded onto the bar 50 in assembly, as will be explained further, and as illustrated. Each bearing tab 60 has a suitable bearing hole therein of slightly larger diameter than the outside diameter of the bar 50, so as to permit free radial turning of bar 50 therein, and also to permit arms 23, of the trapeze bar unit, to be positioned pivotally on bar 14 in different arcs from the perpendicular, for reasons to be explained. It will be seen that a pulling and lifting of the handle portion 53, as indicated in dotted lines of Fig. 5, of latch releasing means 50, will cause the portion 51 to rotate in its bearing tabs 60 and, as a result, a swinging of the arms 52 thereof, clockwise as viewed in Figure 7, and also indicated in dotted lines, and said movement will cause a lifting of each latch 41, on its pivot 45, by hook 55 engaging and lifting the latch by its bar 44. Each latch 41 has a lifting bar 44 welded thereto across its top, opposite its notches, as illustrated. We provide stud-screw bolts 70, as illustrated, to prevent arms 23 from sliding toward each other, and each of the posts 10 prevent such sliding in each of their other directions, as the equivalent of and in lieu of the need of another stud bolt 70 on those respective sides.

Figure 2:
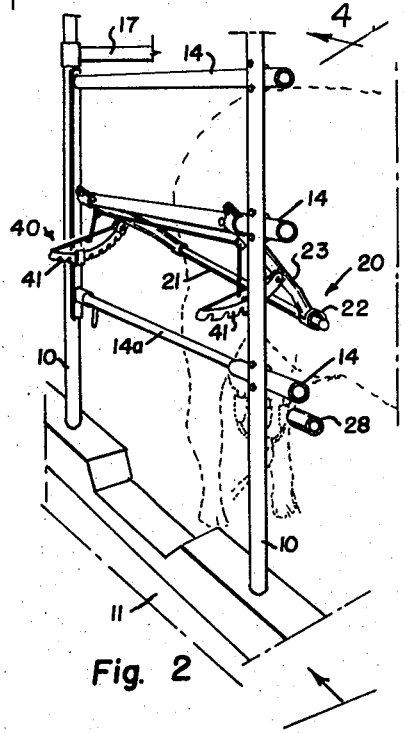
Figure 2 is a partial perspective of the right rear of a stanchion, with a cow therein, showing our anti-kick attachment in place during milking process.
Figure 3:
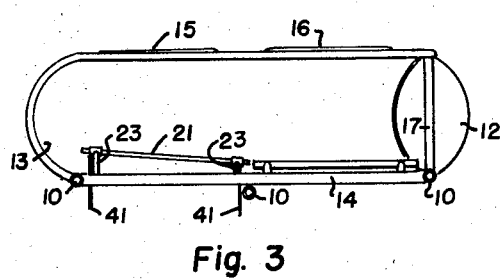
Figure 3 is a reduced top plan view of a stanchion, illustrating how our trapeze bar anti-kick attachment can be swung inwardly of the stanchion by a different arc from the vertical of each pivot-arm of the bar.

The average milk cow is about 28 inches wide through her body and rear hips, and so the inside width of a stanchion, of the type used in modern dairy-parlors, to which we attach our anti-kick attachment, measures about 36 inches at cross stanchion bars 17. Referring to Figures 2 and 4, it will, in view thereof, be readily seen that we use our anti-knock bar attachment in cooperation with the rear left or gate side of the stanchion, being the right side of the stanchion as viewed in Figure 4, by swinging our trapeze bar unit 20 on its pivots 80 inwardly of the stanchion and against the cow's right rear leg, as illustrated, and so as to push her body tightly against the far or left rear of the stanchion, and so as to hold her body therebetween that left side of the stanchion and the bar 21 of our trapeze bar unit 20 by locking the bar 21 against her said leg. In the process of manually pushing the bar 21, by its pivot arms 23, over against the cow, and in so doing pushing her body over against the left rear side of the stanchion, she necessarily is required to move her right rear leg side-ways inwardly of the vertical axis of her body, due to the pressure of the bar 21 against that leg, and in said movement that puts her rear legs closer together than she would normally have them, and holds them there in that off-balance position, which we have found to be a most effective anti-kick prevention, as first explained in this application, as with her right leg so pushed over and so held she cannot kick with either leg. In use, when the bar 21 is pushed against the right leg of the cow as far as it is possible to move her over and push her said leg toward the center of her body, then the latches 41 fall down on their respective bolts 43, and our unit 20 acts as automatic holding means to hold the cow in that position until released. Referring to Figures 2, 3 and 4, it is to be noted that the conformity of the outer surface of the cow's right rear leg, just above the so-called knee joint thereof, is such that it is necessary to swing the rear one of arms 23, of the trapeze unit 20, inwardly of the stanchion, farther, or in a greater arc from the vertical, than the front one of those arms 23, speaking relative to the cow's body, in order to have the bar 21 substantially rest or push evenly or in pressure contact equally throughout the portion of that bar as abuts said exterior of said leg portion, and, it has been found that such condition varies with different animals. That is the reason we make our pivot points 80, at the top of each arm a loose fit on bar 14, and also the socket 22, at the lower end of each of said arms 23, as a loose fit over the bar 21, and similarly the projection bearings 60 fit also loose over bar 51, to permit a so-called wracking of the trapeze swing unit 20, in use, necessarily, as just explained, whereby bar 21 rests against the cow's rear leg with bar 21 at an angle to the longitudinal front to back axis center line of the stanchion.

It is very important, when a milk cow is in place in her stanchion, in modern milking parlors, where milking machines are used, to assure that the cow will not kick during that milking process, because, though not illustrated, it is to be understood that the operator walks in an alley alongside tandem aligned sets of stall or stanchions, running the milking machines, and that alley, as previously mentioned, is depressed about three feet below the level of the floor of the stanchion, or, as viewed in Figure 4, with the result that the operator's head, as he applies and removes the milking cups by reaching into the stanchion to the cow's udder, to the cow's teats, is of a height alongside the left of the cow, see as illustrated in Figure 4, and which head point we illustrate diagrammatically as point "x" otherwise severe injury would result to the operator by the cow kicking him.

In Figure 7, by dotted lines, we have illustrated how, upon completion of the milking, when the operator raises the handle 53, that raising causes the entire yoke latch-releasing means 50 to pivot clockwise, as illustrated partially in Figure 7, in its bearing openings of 60, and thereby causing a swinging clockwise of its arms 52, and thereby each arm hook 55 rides up under and raises its lifting rods 44 secured to its latch bar 41, and those rods 44 being integral with 41, the latches 40 are pivotally disengaged from their respective bolts 43, and as a result the entire trapeze bar unit 20 swings down of its own weight toward its adjacent side of the stanchion on its pivots 50, thus releasing the cow. To release the cow from the conventional stanchion, front gate 16 is opened, by a manual pulling of crank 16a which opens that gate, and she leaves the stanchion. The same action is done, before milking, to get the cow into the stanchion, at the rear gate, by a pulling of the crank 15a, which opens that gate, and, after she has entered the stanchion thereby, then that crank is closed or swung back against its adjacent post 10, which not only closes that gate but also locks it from being pushed open by the cow leaning thereagainst, in conventional manner, as illustrated in solid lines of Figure 1.

From the foregoing detailed description, in connection with the accompanying drawings, it will be seen that we have provided an exceedingly strong, simple and easily constructed novel anti-kick attachment, which may be readily attached to any modern stanchion stall, having a horizontal set or plurality of stanchion side bars on the milking side, and by the use of which a cow therein will be held from kicking during the milking process.

As many changes and modifications may be made within the spirit and teaching of our invention, from the preferred embodiment thereof herein illustrated and described, we wish to be bound only by the scope of the hereunto appended claims.

What we claim and desire to secure by Letters Patent is:

1. In combination with a milking-parlor cow stanchion of the type described having a post and a horizontal round frame-bar carried thereby with both adjacent the right rear leg of a cow to be confined in the stanchion, a wrackable pendulum-like trapeze-bar anti-kick unit attachment adapted to be pivotally mounted onto said frame-bar adjacent said post and comprising, a rigid arm pivotally and loosely hung on said frame-bar adjacent said post, loose strap-pivot-means rigidly secured to one end of said arm and adapted for effecting loose pivotal hanging of said arm on said frame-bar, means for rigidly securing the strap-pivot-means to the one end of the arm, the frame-bar having a stationary stop means spacedly thereon a distance from the post and positioned to adapt the arm to be freely pivoted as a pendulum by its loose-strap-pivot-means on said frame-bar and between the post and said stop means, a collar-socket-means rigidly secured to the other end of the arm, means for rigidly securing the collar-socket-means to the other end of the arm, a rigid trapeze-bar adapted to be pressed against the right rear leg of a cow to be confined in the stanchion and with said bar at an angle to the longitudinal front to back axis center line of the stanchion and being loosely carried by and within the collar-socket-means and at substantially a right angle to said arm, the internal size of the collar-socket-means being greater than the outer cross-sectional size of the trapeze-bar, and automatically operable and manually releasable latch-holding-means pivotally mounted onto and carried by said arm and adapted for latch engagement thereof with a latch-bolt-means of the adjacent post and for latch holding of the arm in any one of certain pendulum-in-stanchion-direction positions of the arm by its said pivot on said frame-bar, the post having a latch-bolt means adjacent the latch-holding means of the adjacent arm and adapted to be engaged by the latch-holding means, and pivot means secured to and carried by the arm for so pivotally mounting the latch-holding-means thereto.

2. A pendulum-like anti-kick trapeze-bar unit attachment for cow-cage-stanchions of the type described having a horizontal frame-bar extending from a post positioned on the right rear side of a cow to be confined in the stanchion, adapted for confining the cow between the trapeze-bar and the side of the cage opposite therefrom, comprising, a rigid trapeze arm having two ends and being pivotally secured at one of its ends to the frame-bar adjacent the post, pivot means rigidly connected with said arm one end for so pivotally securing the arm by that end to the frame-bar, a rigid bar loosely secured to and carried at substantially a right angle to and by the other end of the arm and adapted to be moved in a limited arc movement thereof on its loose connection point with the arm as a pivot for adapting the bar to conform with the plane of the outside surface of the right rear leg of a cow to be confined within the stanchion, securing means for so loosely securing the bar to the other end of the arm and with said securing means being the pivot point of such arc movement adaptability of the bar, said bar portion being adapted upon an in-stanchion-directional-pendulum-swinging of the trapeze arm to thereby be pressed against the right side of the right rear leg of the cow to be confined within the stanchion and with said bar at an angle to the longitudinal front to rear axis center line of the stanchion, and operable latch-holding means operably secured to and carried by the arm and adapted for latch engagement with a companion latch member carried by the post for releasable latch holding of the trapeze arm upon any one of certain in-stanchion-directional-pendulum-swinging positions of said arm, and operable securing means for so operably securing the latch-holding means to and so as to be carried by the trapeze arm, the post having a companion latch member thereon adjacent the latch-holding means of the arm and adapted for latch engagement thereof by the latch-holding means.

3. The combination with a cage-frame-type cow enclosure for a milking parlor of the type described adapted for confinement of a cow to be milked therein and having a pair of spaced apart posts and a round frame-bar extending between said posts, said posts and bar being on the milking right side toward the rear of the cow to be milked therein, of a wrackable pivotally-operable U-shaped anti-kick pendulum-trapeze-bar unitary attachment adapted to be pivotally mounted on said frame-bar and adapted for confining the cow between it and the opposite side of the stanchion cage frame therefrom and comprising, a pair of spaced apart independently pivotally operable identical pivot-arms each having two ends and being each separately pivotally mounted onto said frame-bar at one of its ends with each positioned thereon adjacent one of said posts, a pair of identical pivot-means and with one thereof rigidly secured to one end of one of said arms and the other of said pivot means rigidly secured to the one end of the other of said arms and each being adapted for pivotal-mounting-connection of its arms onto said frame-bar, said frame-bar having a pair of stationary stop means positioned thereon and each adapted for confining an arm operably and freely-pivotally on the frame-bar between the stop means and said arm's adjacent post, a pair of identical securement means with one thereof on one arm and the other thereof on the other arm for so rigidly securing said pivot-means of its arm to said one end of that arm, a rigid cow-right-rear-leg-holder trapeze-bar loosely carried by and extending between said other ends of each of said arms and in loose-socket-pivotal relationship with each of said other ends of each of said arms and adapted to be pressed against the right rear leg of a cow to be confined in the enclosure and with said bar at an angle to the longitudinal front to rear axis center line of the cage enclosure, a pair of identical loose-socket-pivot means and with one thereof secured to one other end of one of said arms and the other thereof secured to the other end of the other of said arms and each being adapted for loosely carrying said trapeze-bar thereby, identical securement means with one thereof on the other end of one arm and the other thereof on the other end of the other arm for securing each loose-socket-pivot-means of the other end of its arm to said other end of that arm, a pair of independently and automatically engagingly operable and manually releasable identical latch-holding means each pivotally mounted to one of said arms and each being adapted for engaging a latch-bolt means carried by the respective arm's adjacent post upon any one of certain in-stanchion-adaptable-directional and independent and different pendulum positioning of said arms on said frame-bar and upon such engagement each latch-holding means being adapted for removably holding its arm in its respective position, identical pivot means on each arm for so pivotally securing the latch holding means of and to its arm, each of said stanchion posts having an identical latch-bolt means thereon adjacent its adjacent arm's latch-holding means and adapted for engagement by said adjacent latch-holding means, said arms and cow-leg-holder trapeze-bar being adapted for in-stanchion-directional loose-wrackable-pendulum manual swinging movement thereof as a unit on said frame-bar, for pressing the bar thereof against the outside of the cow's right rear leg and in conformity with the plane of the outer surface of the cow's said leg, one manually operable lever-yoke-shaped latch-releasing-means loosely pivotally mounted and carried on and by and extending between each of said arms and in operable releasable engagement with each of said latch-holding-means upon manual operation thereof, and each of said arms having a loose-bearing pivot means formed thereon and each of said bearing means adapted for so loosely and pivotally mounting and carrying the latch-releasing means lever-yoke therein and thereby.

References Cited in the file of this patent

UNITED STATES PATENTS

| | | |
|---|---|---|
| 1,195,419 | Trim | Aug. 22, 1916 |
| 1,512,610 | Kolb | Oct. 21, 1924 |
| 1,621,760 | Stader et al. | Mar. 22, 1927 |
| 1,754,752 | Grim | Apr. 15, 1930 |
| 2,762,334 | Allen | Sept. 11, 1956 |